Oct. 23, 1934.  S. HEINTZ ET AL  1,978,049
METHOD FOR MAKING COMPOSITE ARTICLES
Filed Aug. 30, 1932
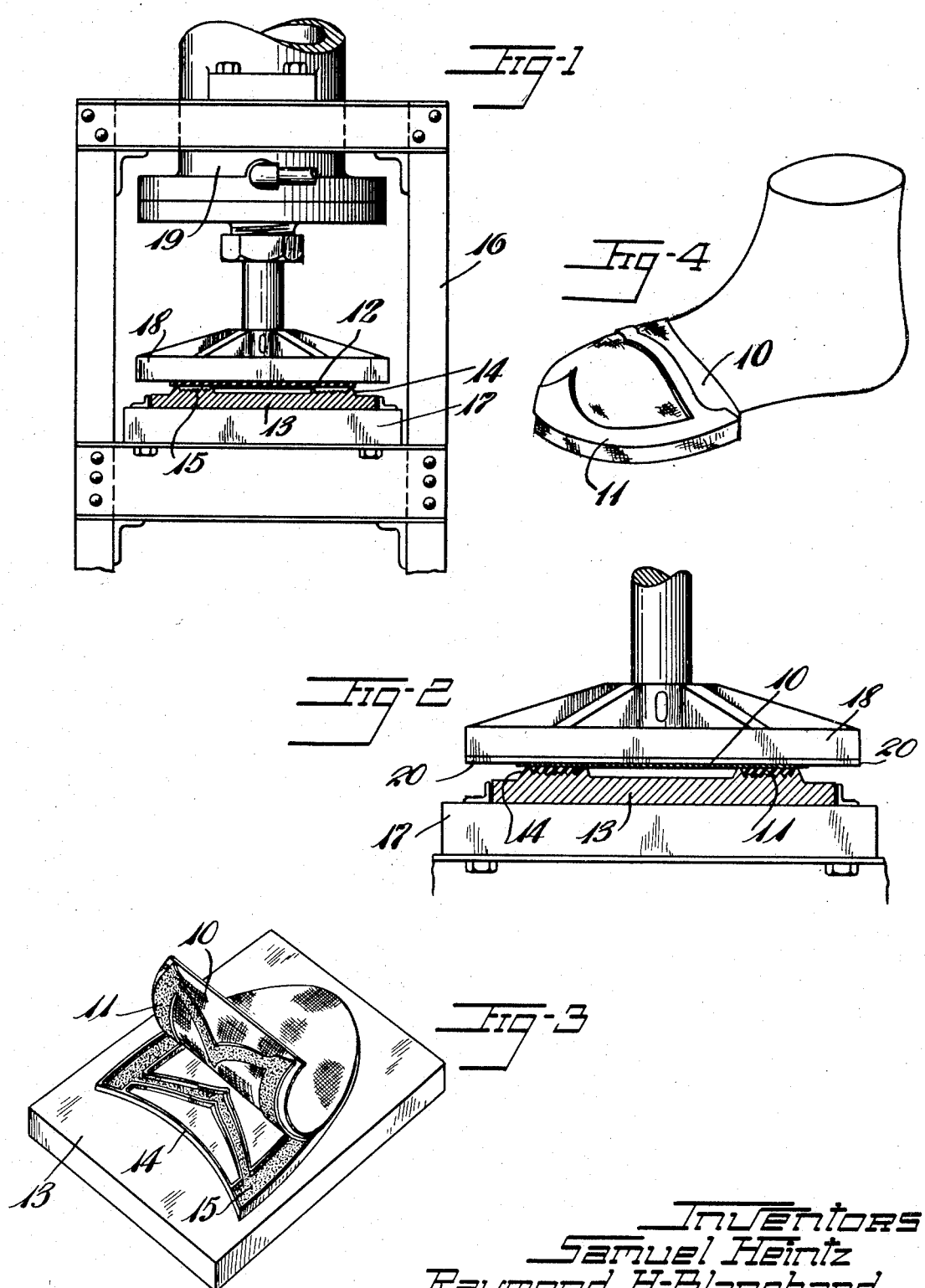
Inventors
Samuel Heintz
Raymond H. Blanchard Patented Oct. 23, 1934

1,978,049

UNITED STATES PATENT OFFICE 1,978,049

METHOD FOR MAKING COMPOSITE ARTICLES

Samuel Heintz, Watertown, and Raymond H. Blanchard, Malden, Mass., assignors, by mesne assignments, to Hood Rubber Company, Inc., Wilmington, Del., a corporation of Delaware Application August 30, 1932, Serial No. 630,990

1 Claim. (Cl. 41—33)

This invention relates to the manufacture of composite articles, especially footwear comprising fabric or other sheet material having one or more deposits of plastic material, such as rubber composition, adhered to the sheet material over determinately limited areas thereof for such purposes as reinforcement and ornamentation.

The chief objects of this invention are to provide improved procedure and improved apparatus for producing such composite articles, and especially to provide conveniently for separating the deposit from sheet plastic material and molding it to its final shape before it is adhered to the sheet backing.

In the accompanying drawing:

Fig. 1 is an elevation, with parts broken away and in section, of apparatus for cutting and molding sheet plastic material in a single operation in accordance with the invention in its preferred form.

Fig. 2 is an elevation, with parts broken away and in section, of apparatus for pressing a sheet backing into adhesive engagement with the molded plastic material in the mold recess in accordance with the invention.

Fig. 3 is a perspective view of a mold member constructed according to and embodying the invention in its preferred form, a shoe upper component made in accordance with the invention being shown partially removed from the mold face.

Fig. 4 is a perspective view of a footwear last having the shoe upper part shaped upon it.

Referring to the drawing, 10 is a component of fabric or other sheet material for a footwear upper having a deposit 11 of plastic material, preferably rubber composition, molded in adhesion with the fabric over a determinately limited area thereof for reinforcement and ornamentation.

According to the preferred procedure for making the composite article, the plastic material in sheet form 12 is superimposed upon the face of a mold member 13 having raised ridge portions 14 formed with cutting edges and delineating between them a mold recess 15 of determinate configuration and preferably of a depth less than the height of the ridge portions 14 above the adjacent face of the mold member. The sheet of plastic material is then pressed against the mold face to separate the plastic material along the ridge portions, or to force the ridge edges into the plastic material a sufficient depth to permit subsequent ready separation, and to press the material in the recess against the walls thereof to mold the same, the recess walls being suitably embossed or plain, as desired, to provide the desired form of surface on the molded deposit.

The surplus plastic material lying outside the mold recess is then removed from the mold face, which lies so far below the tops of the ridges that the stock is not forcibly pressed against it, and the fabric 10 is superimposed upon the molded deposit in the mold recess and is pressed into adhesive engagement with the exposed surface of the deposit, with or without the incorporation of a cementitious material between the backing and the deposit, depending upon the adhesive quality of the plastic material used. The backing is then removed with the molded deposit adhered thereto, and the composite structure is then shaped to the desired form as shown in Fig. 4, the use of rubber as the plastic material permitting such manipulation without injury to it. If desired, the article may be vulcanized or partially vulcanized before it is removed from the mold.

Both the operation of cutting and molding the plastic material and the operation of pressing on the fabric may be effected in a press 16, the ridged mold member 13 being positioned in the lower platen 17 thereof, and the upper platen 18 being urged downwardly, as by means of a fluid pressure cylinder 19, to press the sheet plastic material against the mold face for the first operation. For pressing on the fabric backing, the same press, or preferably another similar one, may be used, it being preferred for this operation to provide the upper press plates with a padded face 20 (Fig. 2) to assure pressure of the fabric against the plastic material in the mold recess in case the deposit is of less height than the mold ridges.

By this procedure the plastic material is conveniently cut from the sheet form and molded to its final shape in a single operation, and as no flow of the material is required during the operation of pressing on the backing, undesirable spreading of the material beyond the edge of the desired area of the fabric is conveniently and effectively avoided.

Variations may be resorted to without departing from the scope of the invention as it is defined in the following claim.

We claim:

The method of making a composite article which comprises pressing sheet rubber composition against a surface having ridge portions delineating a mold recess, removing the surplus rubber and leaving the rubber in the said recess by separation of the rubber along the ridge portions of the surface, pressing a flexible sheet backing into adhesive engagement with the rubber material in the recess, removing the backing with the rubber adhered thereto, then manipulating the backing to the shape of the desired article, and then vulcanizing the rubber.

RAYMOND H. BLANCHARD.
SAMUEL HEINTZ.